(12) United States Patent
Amtmann

(10) Patent No.: US 6,819,223 B2
(45) Date of Patent: *Nov. 16, 2004

(54) TRANSPONDER SYSTEM WITH ACKNOWLEDGEMENTS ASSOCIATED WITH RESPECTIVE TRANSPONDERS

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/456,797

(22) Filed: Jun. 7, 2003

(65) Prior Publication Data

US 2003/0210133 A1 Nov. 13, 2003

Related U.S. Application Data

(63) Continuation of application No. 09/352,317, filed on Jul. 12, 1999, now Pat. No. 6,583,717.

(30) Foreign Application Priority Data

Jul. 13, 1998 (EP) ............................................. 98890202

(51) Int. Cl.[7] ................................................ H04Q 5/22
(52) U.S. Cl. .................... 340/10.5; 340/10.1; 340/10.3; 340/10.2; 340/10.4; 340/10.5; 340/10.32; 340/10.51; 340/572.1

(58) Field of Search ................................ 340/10.5, 10.1, 340/10.24, 10.3, 10.2, 10.4, 825.49, 10.32, 572.1, 10.51

(56) References Cited

U.S. PATENT DOCUMENTS

| 5,537,105 A | 7/1996 | Marsh et al. ................ 340/825 |
| 5,539,394 A | 7/1996 | Cato et al. ..................... 825/54 |
| 5,539,755 A * | 7/1996 | Baggen ....................... 714/779 |
| 6,061,614 A * | 5/2000 | Carrender et al. ............. 701/33 |
| 6,107,917 A | 8/2000 | Carrender et al. .......... 340/505 |
| 6,583,717 B1 * | 6/2003 | Amtmann ................... 340/10.1 |

* cited by examiner

Primary Examiner—Michael Horabik
Assistant Examiner—Vernal Brown
(74) Attorney, Agent, or Firm—Kevin Simons

(57) ABSTRACT

During a communication operation in a transponder system, consisting of a write/read station (1) and at least one transponder (2), a selection data block (SDB) is transmitted from the station (1) to at least one transponder (2) and, in response to the received selection data block (SDB), at least one transponder (2) transmits an identification data block (IDB) to the station (1), after which the station (1) transmits, in response to the identification data block (IDB), an acknowledge data block (QDB) to a transponder (2), the bit configuration of the acknowledge data block (QDB) being formed while using only a part (PM1) of the identification data block (IDB) associated with a transponder (2).

10 Claims, 2 Drawing Sheets

US 6,819,223 B2

TRANSPONDER SYSTEM WITH ACKNOWLEDGEMENTS ASSOCIATED WITH RESPECTIVE TRANSPONDERS

RELATED APPLICATIONS

This application is a continuation of application Ser. No. 09/352,317, now U.S. Pat. No. 6,583,717 filed Jul. 12, 1999.

The invention relates to a method for communication between a write/read station of a transponder system and at least one transponder of the transponder system in which a selection data block is transmitted by the write/read station to at least one transponder, in which the transmitted selection data block is received by at least one transponder, in which, after reception of the transmitted selection data block, at least one transponder transmits an identification data block, which is associated with this transponder and has a given bit configuration, transmitted to the write/read station in response to the transmitted selection data block, in which the transmitted identification data block is received by the write/read station, in which, after the reception in the write/read station of the identification data block associated with a transponder, an acknowledge data block which is associated with this transponder and has a given bit configuration is generated in response to the received identification data block, in which the generated acknowledge data block is transmitted by the write/read station to the transponder with which the generated acknowledge data block is associated, and in which the transmitted acknowledge data block is received by the transponder with which the acknowledge data block is associated, the acknowledge data block associated with a transponder being related to the identification data block associated with this transponder.

The invention also relates to a write/read station for a transponder system which is arranged to communicate with at least one transponder of the transponder system and includes a generating stage for generating a selection data block, transmitter means for transmitting the generated selection data block to at least one transponder, receiver means for receiving an identification data block which is transmitted to the write/read station by a transponder, in response to the selection data block transmitted to this transponder, and is associated with this transponder, processing means for processing a received identification data block, generating means for generating an acknowledge data block which is associated with a transponder and has a given bit configuration, and transmitter means for transmitting a generated acknowledge data block to the transponder with which the generated acknowledge data block is associated, the acknowledge data block associated with a transponder being related to the identification data block associated with this transponder.

The invention also relates to a transponder for a transponder system, which transponder is arranged to communicate with at least one write/read station and includes receiver means for receiving a selection data block transmitted by a write/read station, processing means for processing a received selection data block, transmitter means for transmitting an identification data block, associated with the transponder, to a write/read station in response to the selection data block transmitted to the transponder by the write/read station, receiver means for receiving an acknowledge data block which is transmitted to the transponder by the write/read station in response to the identification data block transmitted to the write/read station, is associated with the transponder and has a given bit configuration, and processing means for processing the received acknowledge data block.

The invention also relates to an integrated circuit for a transponder which is arranged to communicate with at least one write/read station, which integrated circuit includes receiving connection means for receiving a selection data block transmitted by a write/read station, processing means for processing a received selection data block, output connection means for outputting an identification data block, associated with the circuit, to a write/read station in response to the selection data block transmitted to the circuit by the write/read station, receiver means for receiving an acknowledge data block which is transmitted to the circuit by the write/read station in response to the identification data block transmitted to the write/read station, is associated with the circuit and has a given bit configuration, and processing means for processing the received acknowledge data block.

A method of the kind set forth in the first paragraph, a write/read station of the kind set forth in the second paragraph, a transponder of the kind set forth in the third paragraph and an integrated circuit of the kind set forth in the fourth paragraph are known, for example from the patent document U.S. Pat. No. 5,539,394 A. The cited patent document describes a transponder system in which communication between the write/read station and a plurality of transponders takes place, in successive time slots of time slot sequences, communication between the write/read station and a transponder actually taking place exclusively if only a single transponder is associated with each time slot. This is the case when a sole transponder transmits its associated identification data block to the write/read station in a time slot, i.e. if no collision occurs between two or more identification data blocks from two or more transponders in one time slot. In the known transponder system the write/read station transmits an acknowledge data block to each sole transponder having transmitted its associated identification data block to the write/read station in a time slot, so that each of these transponders is signaled that the write/read station has correctly recognized and hence selected the relevant transponder. As described in the cited patent document U.S. Pat. No. 5,539,394 A; the transmission of the respective acknowledge data block associated with a transponder can take place in the same time slot in which a transponder has transmitted its identification data block to the write/read station. In this case each acknowledge data block may have the same bit configuration and consist, for example of a predetermined number of "0" bits or "1" bits, for example one byte with a total of eight "0" bits, however, without an own acknowledge data block being associated with each transponder. The cited patent document U.S. Pat. No. 5,539,394 A does not provide further information as regards the bit configuration of the acknowledge data blocks transmitted to the transponders by the write/read station in each time slot.

The cited patent document U.S. Pat. No. 5,539,394 A also describes a second possibility for the transfer of acknowledgements from the write/read station to the selected transponders. This second possibility consists in that acknowledgement takes place at the end of a time slot sequence, consisting of a plurality of time slots, in that at the end of such a time slot sequence a group acknowledge data block and subsequently additionally all identification data blocks of the sole transponders having transmitted their associated identification data block to the write/read station in a time slot in the preceding time slot sequence are transmitted to these transponders by the write/read station. It is thus achieved that for each transponder the write/read station transmits only an acknowledgement exclusively associated with this transponder to this transponder; however each acknowledgement associated with a transponder then consists of the group acknowledge data block and the overall identification data block of the relevant transponder. Consequently, each acknowledgement in the known transponder system has a detrimentally long data block length; this is unattractive with a view to achieving an as short as possible communication time between the write/read station and the plurality of selected transponders, and also with a view to achieving an as small as possible number of modulation steps for the transmission of an acknowledgement from the write/read station to the transponders. An as small as possible number of modulation steps is always desirable, because a comparatively high number of modulation steps has an adverse effect on the level of side bands of the carrier signal occurring during a transmission utilizing a modulated carrier signal; this is because a comparatively high number of modulation steps causes detrimentally high levels of the side bands, giving rise to conflicts in many countries with official rules and regulations which define a maximum permissible level for these side bands.

It is an object of the invention to avoid the described problems and to provide an improved method, an improved write/read station, an improved transponder and an improved integrated circuit.

In order to achieve this object, a method of the kind set forth in the first paragraph according to the invention is characterized in that in the write/read station an acknowledge data block is generated for each transponder wherefrom an identification data block has been received, the bit configuration of said acknowledge data block being formed while using only a part of the identification data block associated with the relevant transponder.

In order to achieve the described object, a write/read station of the kind set forth in the second paragraph according to the invention is characterized in that the generating means are arranged to generate a respective acknowledge data block for a transponder, the bit configuration of said acknowledge data block being formable while using only a part of the identification data block associated with the relevant transponder.

In order to achieve the described object, a transponder of the kind set forth in the third paragraph according to the invention is characterized in that the transponder includes generating means for generating the acknowledge data block associated with the transponder, and that the transponder includes comparison means which can be supplied with the acknowledge data block generated by the generating means and with the acknowledge data block transmitted by a write/read station and received by the transponder, and can output at least control information representing the comparison result.

In order to achieve the described object, an integrated circuit of the kind set forth in the fourth paragraph according to the invention is characterized in that the circuit includes generating means for generating the acknowledge data block associated with the circuit, and that the circuit includes comparison means which can be supplied with the acknowledge data block generated by the generating means and with the acknowledge data block transmitted by a write/read station and received by the circuit, and can output at least control information representing the comparison result.

Using only simple means, the steps according to the invention simply ensure that, in order to acknowledge the selection of a transponder according to the invention, an acknowledge data block which is associated only with the relevant transponder is transmitted from a write/read station according to the invention to a relevant transponder according to the invention; the foregoing is advantageously achieved by means of an acknowledge data block having only a short data block length, which is advantageous with a view to achieving an as short as possible communication time or transmission time and also with a view to achieving as few as possible modulation steps for the transmission.

These and other aspects of the invention will be apparent from the embodiment described hereinafter.

The invention will be described in detail hereinafter with reference to an embodiment shown in the drawings; however, the invention is not restricted thereto.

Figure 1:
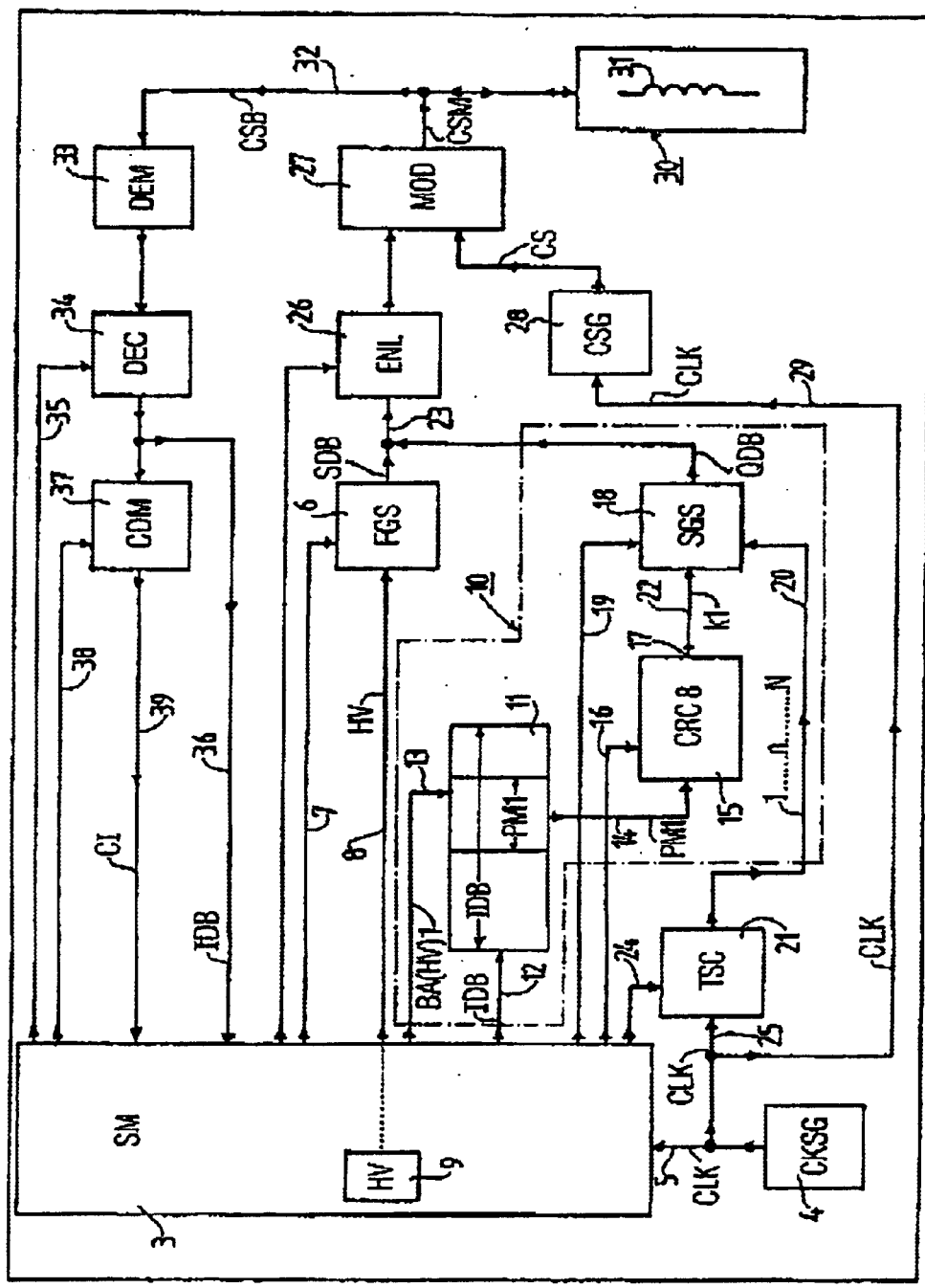
FIG. 1 shows a block diagram of an in this context essential part of a write/read station in an embodiment according to the invention.
Figure 2:
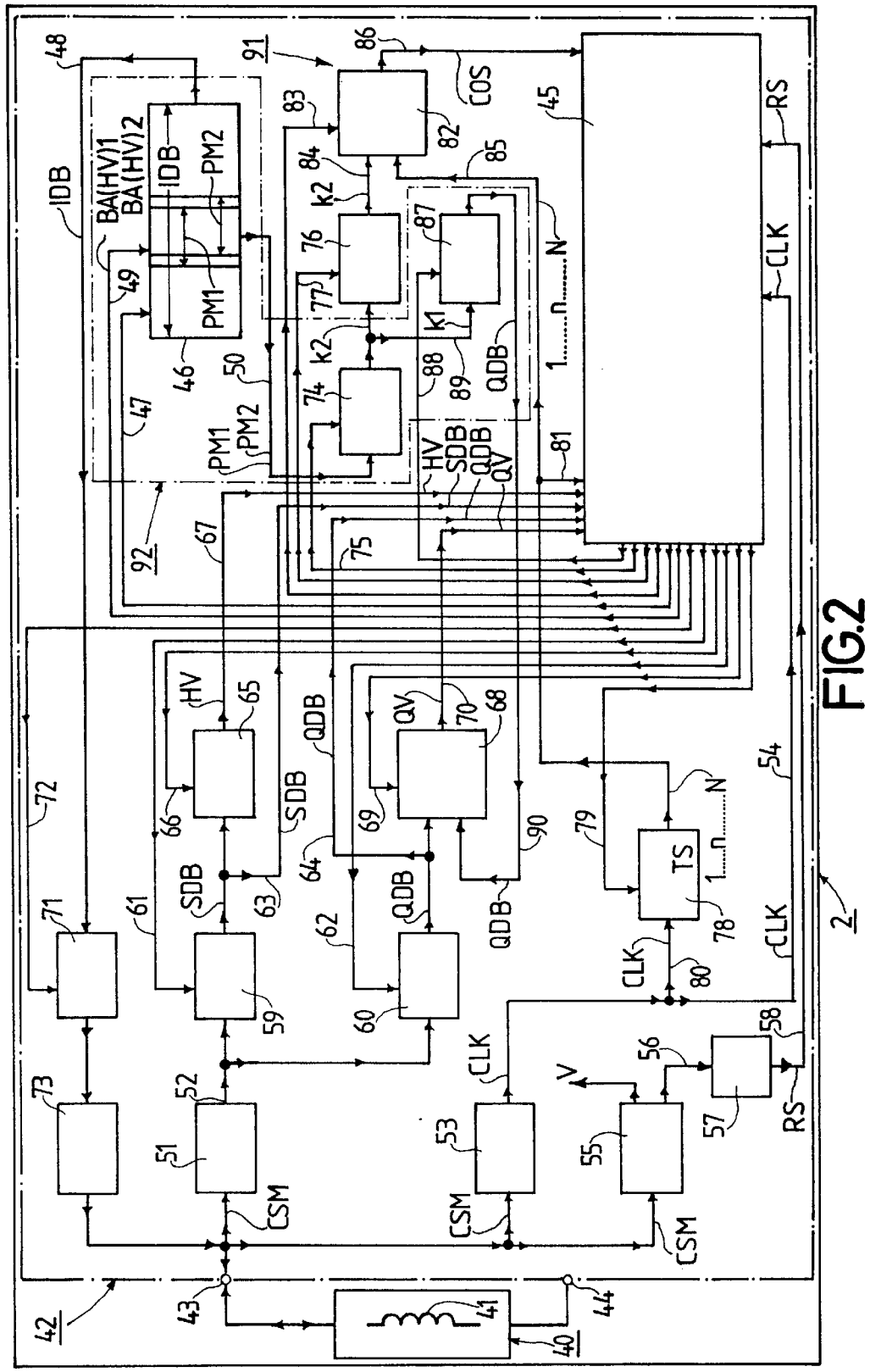
FIG. 2 shows a block diagram of an in this case essential part of a data carrier and an integrated circuit for this data carrier in an embodiment according to the invention.

FIG. 1 shows a block diagram of a part of a write/read station 1 of a transponder system which will be referred to hereinafter as the station 1 for the sake of brevity. The station 1 is arranged and constructed for communication with a plurality of transponders 2 of such a transponder system. FIG. 2 shows such a transponder 2 which will be referred to hereinafter as the data carrier 2.

In respect of the communication between the station 1 and the data carriers 2 it is to be noted in advance that such communication takes place mainly in the form of data blocks DB, each data block DB consisting of a predetermined number of bytes, each byte consisting of a predetermined number of bits, being 8 bits in the present case. Instruction data blocks can be transferred from the station 1 to the data carriers 2 in the course of a communication between the station 1 and the data carriers 2; only one instruction data block thereof will be elaborated upon herein, that is to say a selection data block SDB. The station 1 can also transmit further instruction data blocks to the data carriers 2, for example a read data block, a write data block and a stop data block which, however, are not elaborated upon herein.

A selection data block SDB contains a selection instruction code, a hash value HV which is contained in the station 1, and information concerning a given number of time slots TS as well as, indirectly, information concerning the length of these time slots TS. A data carrier 2, or a plurality of data carriers 2, can be selected from a plurality of data carriers 2 by means of a selection data block SDB.

The station 1 can also generate an acknowledge data block QDB in the course of a communication between the station 1 and a data carrier 2. Using an acknowledge data block QDB, the station 1 informs a carrier 2 first of all that the station 1 has correctly received an identification data block IDB transmitted to the station 1 by a data carrier 2, and secondly that the instruction corresponding to an instruction data block previously transmitted to a data carrier 2, for example a read data block or a write data block or a stop data block, is to be executed by a data carrier 2. The acknowledge data block QDB may be formed, for example as a data block containing a given, invariable bit configuration or a given, invariable bit pattern. However, it is much more advantageous to generate for each data carrier 2 an acknowledge data block QDB which is exclusively associated with the relevant data carrier and whose bit configuration is related to the identification data block IDB which is transmitted to the station 1 by the relevant data carrier 2 and is associated with the relevant data carrier 2 as a characteristic. This aspect will be described in detail hereinafter.

In the course of a communication between the station 1 and a data carrier 2, a data carrier 2 transmits an identification data block IDB to the station 1. The identification data block IDB is significant and characteristic of the relevant data carrier 2. Each data carrier 2 contains an identification data block IDB which is reserved specifically for this carrier and is issued only once. For example, such an identification data block IDB may represent a so-called serial number.

The construction of the station 1 will be described in detail hereinafter with reference to FIG. 1.

The station 1 includes sequencing means 3 which control a plurality of routines and functions, only the in this context essential routines and functions thereof being described in detail hereinafter.

The station 1 also includes a clock signal generator 4 which generates a clock signal CLK having a frequency of 13.56 MHz. The clock signal CLK can be applied to the sequencing means 3 via a connection 5.

The station 1 also includes a first generating stage 6 which is arranged to generate the instruction data blocks, i.e. to generate selection data blocks SDB, read data blocks, write data blocks and stop data blocks. The first generating stage 6 can be controlled by the sequencing means 3 via a connection 7. Via a further connection 8, the first generating stage 6 can be supplied with a so-called hash value HV which is contained in the sequencing means 3 as diagrammatically denoted by way of a block 9. The hash value HV is integrated in each generated selection data block SDB and hence is transmitted, together with the selection data block SDB, to the data carriers present within the communication range of the station 1.

The station 1 also includes generating means 10 which are arranged to generate each time an acknowledge data block QDB. The generating means 10 include a memory 11 for storing an identification data block IDB transmitted by a data carrier 2 and received by the station 1. The identification data block IDB consists, for example of a total of 8 bytes, each of which contains 8 bits. A received identification data block can be applied to the memory 11, via a connection 12, from the sequencing means 3. The memory 11 can also be controlled by the sequencing means 3 via a further connection 13. Via the connection 13, the memory 11 can be supplied with a bit address BA(HV)1 which corresponds to the hash value HV and forms an initial address for a part PM1 of the identification data block IDB stored in the memory 11. In the present case the bit address BA(HV)1 is formed directly by the hash value. Such a bit address is often referred to as a "pointer". The part PM1 of the identification data block IDB, determined by the hash value HV, can be output via a connection 14 by controlling the memory 11, via the connection 13, with the bit address BA(HV)1.

The generating means 10 of the station 1 also include a so-called CRC8 stage 15. It is to be noted that the abbreviation CRC8 stands for "Cross Redundancy Check". The CRC8 stage 15 can be controlled by the sequencing means 3 via a connection 16. The CRC8 stage 15 can receive the part PM1 of the identification data block IDB via the connection 14. The part PM1 applied to the CRC8 stage 15 is shifted through the CRC8 stage 15; during this shift an algorithm which can be realized by the CRC8 stage 15 is executed, after which a given value k1 is obtained at an output 17 of the CRC8 stage, which value constitutes control information corresponding to the read part PM1 of the stored identification data block IDB.

The generating means 10 also include a second generating stage 18 for generating a respective acknowledge data block QDB having a given bit configuration. The second generating stage 18 can be controlled by the sequencing means 3 via a connection 19. Furthermore, the second generating stage 18 can be controlled by a time slot counter 21, via a further connection 20, as will be described in detail hereinafter. Furthermore, via a connection 22, the second generating stage 18 can also be supplied with control information in the form of the value k1 delivered via the output 17 of the CRC8 stage 15. The second generating stage 18 can be activated by the time slot counter 21, via the connection 20, in a given time slot TS(1 . . . . n . . . N) from among a total of N time slots. When the second generating stage 18 is activated, it is arranged to generate an acknowledge data block QDB having a bit configuration which is determined by the value k1 output as control information by the CRC8 stage. It is thus achieved that the acknowledge data block QDB each time generated has a bit configuration which is generated by using only a part PM of the identification data block IDB associated with a data carrier 2, which identification data block IDB is each time stored in the memory 11 and the part PM1 of which can be applied to the CRC8 stage 15 in which it can be processed so as to generate the control information formed by the value k1. The acknowledge data block QDB each time generated by the generating means 10 can be output, via a connection 23, by the second generating stage 18 of the generating means 10. The selection data block SDB each time output by the first generating stage 9 can also be output via the connection 23.

The station 1 also includes the above-mentioned time slot counter 21 which constitutes time slot determination means and is capable of determining each time slot TS(1 . . . n . . . N) of time slot sequences, each of which consists of a given number N of successive time slots TS. For example, a time slot sequence may consist of 1, 4, 8, 16, 32, 64, 128 or 256 time slots. The time slot counter 21 can be controlled by the sequencing means 3 via a connection 24. The clock signal CLK can be applied to the time slot counter 21 via a connection 25. The relevant content 1 . . . n . . . N of the time slot counter 21 can be applied, via the connection 20, to the second generating stage 18 of the generating means 10.

The station 1 also includes encoding means 26 which can be supplied with the instruction data blocks generated by the first generating stage 6, for example the selection data block SDB and the acknowledge data block QDB each time generated by the generating means 10, and realize encoding of the data blocks applied thereto. The encoding means 26 can be controlled by the sequencing means 3 via a connection 27.

Modulation means 27 which can be supplied with the encoded data blocks are connected to the encoding means 26. In the present case the modulation means 27 are formed by amplitude modulation means which can be supplied with a carrier signal CS and realize amplitude modulation of the carrier signal CS in dependence on the encoded data blocks supplied by the encoding means 26. The amplitude modulation means 27 are arranged to carry out a 10% amplitude modulation (ASK 10%) and output an amplitude modulated carrier signal CSM.

The station 1 includes a carrier signal generator 28 for generating the carrier signal CS; this generator can be supplied with the clock signal CLK, via a connection 29, and generates the carrier signal CS in dependence on the clock signal CLK, which carrier signal also has a frequency of 13.56 MHz in this case.

Connected to the modulation means 27 are transmitter/receiver means 30 which include a transmitter coil 31 which can inductively transmit the amplitude modulated carrier signal CSM, output by the modulation means 27, to receiver means included in data carriers 2. The transmitter/receiver means 30 thus constitute transmitter means.

The transmitter/receiver means 30 at the same time constitute receiver means whereby signals inductively transmitted to the station 1 by data carriers 2 can be received. Such signals can be applied, via a connection 32, to demodulation means 33 of the station 1. In the present case the demodulation means 33 are arranged to demodulate a load modulated carrier signal CSB, because the inductive data transmission from the carriers 2 to the station 1 is performed in known manner by so-called load modulation of the carrier signal CS.

Connected to the demodulation means 33 are decoding means 34 whereby received data blocks can be decoded. The decoding means 34 can be controlled by the sequencing means 3 via a connection 35. Decoded identification data blocks IDB output by the decoding means 34 can be applied, via a connection 36, to the sequencing means 3 in order to be subjected to further processing by means of the sequencing means 3, notably in order to be stored in the memory 11 of the generating means 10 with the aid of the sequencing means 3.

Collision detection means 37 which can be controlled by the sequencing means 3, via a connection 38, are connected to the decoding means 34. The collision detection means 37 are arranged to detect collisions between two identification data blocks IDB, a collision of this kind being detected on a bit basis. Such a collision of identification data blocks IDB is liable to occur when two or more identification data blocks IDB are received in the station 1 in the same time slot. When the collision detection means 37 detect such a collision of identification data blocks IDB, collision information CI is applied to the sequencing means 3, via a connection 39, so that the sequencing means 3 can perform an appropriate control operation.

The construction of the data carrier 2 will be described in detail hereinafter on the basis of the data carrier 2 shown in FIG. 2.

The data carrier 2, being constructed for contactless communication with at least one write/read station, such as the station 1 shown in FIG. 1, includes receiver/transmitter means 40 which include a transmitter coil 41 and constitute receiver means for receiving data blocks as well as transmitter means for transmitting data blocks.

The data carrier 2 includes a circuit 42, of which FIG. 2 shows only those parts which are of essential importance in the present context. The circuit 42 is constructed as an integrated circuit. The circuit 42 includes a first terminal 43 and a second terminal 44, which terminals are connected to the receiver/transmitter means 40. In this case the terminals 43 and 44 form receiving connection means for receiving data blocks received by means of the receiver/transmitter means 40 as well as output connection means for outputting data blocks to be transmitted by means of the receiver/transmitter means 40.

The circuit 42 includes sequencing means 45 whereby a plurality of routines and functions of the data carrier 2 can be controlled; however, only the routines and functions thereof which are of relevance in the present context will be described in detail hereinafter.

The circuit 42 also includes a memory 46 which is arranged to store the identification data block IDB which characterizes the data carrier 2. The identification data block IDB consists of, for example a total of 8 bytes of 8 bits each.

The memory 46 can be controlled by the sequencing means 45, via a connection 47, so as to output the identification data block IDB, stored in the memory 46, via a connection 48.

The memory 46 can also be controlled by the sequencing means 45 via a further connection 49. The memory 46 can be supplied, via the connection 49, with two bit addresses BA(HV)1 and BA(HV)2, each of which corresponds to the hash value RV and forms an initial address for a part PM1, PM2, respectively, of the identification data block IDB stored in the memory 46. In the present case the first bit address BA(HV)1 is formed directly by the hash value HV. The second bit address BA(HV)2 is formed by adding a given number, for example the number "8", to the hash value HV. The hash value HV is transmitted to the data carrier 2 by the station 1 of FIG. 1 while using the selection data block SDB, so that the hash value HV present in the station 1 and the hash value present in the data carrier 2 are identical. The part PM1 or PM2 of the identification data block IDB, determined by the applied bit address BA(HV)1 or BA(HV)2, respectively, can be output via a connection 50 by driving the memory 46, via the connection 49, with one of the two bit addresses BA(HV)1 and BA(HV)2.

The data carrier 2 includes demodulation means 51 which constitute amplitude demodulation means which are connected to the first terminal 43 and are suitable for demodulating the amplitude modulated carrier signal CSM transmitted by a station 1. The demodulation means 51 output the data blocks DB, transmitted to the data carrier 2, in demodulated but still encoded form, via an output 52.

The data carrier 2 also includes clock signal regenerating means 53 which are also connected to the first terminal 43. The clock signal regenerating means 53 can regenerate the clock signal CLK from the received amplitude modulated carrier signal CSM, so that the clock signal CLK is available in the data carrier 2 as well as in the station 1 transmitting the modulated carrier signal CSM. The regenerated clock signal CLK is applied to the sequencing means 45 via a connection 54.

The data carrier 2 also includes DC voltage generating means 55 which are also connected to the first terminal 43 and can generate, while using the amplitude modulated carrier signal CSM, a DC supply voltage V which serves to feed the entire circuit 42. It is to be noted that the DC voltage generating means 55 include voltage limiting means in order to prevent in known manner the occurrence of an excessive supply voltage V.

Reset signal generating means 57 are connected to the DC voltage generating means 55, via a connection 51, in order to generate a reset signal RS upon occurrence of a DC supply voltage V as is the case when the data carrier 2 enters the communication range of a station 1, said reset signal being capable of initiating a so-called "power-on-reset". The reset signal RS can be applied to the sequencing means 45 via a connection 58.

The data carrier 2 includes a series of decoding means for the decoding of encoded data blocks which are output via the output 52 of the demodulation means 51; FIG. 2 shows no more than two of such decoding means. These means are first decoding means 59 for decoding a selection data block SDB and second decoding means 60 for decoding an acknowledge data block QDB. The inputs of said decoding means 59 and 60 are connected to the output 52 of the demodulation means 51. The first demodulation means 59 can be controlled by the sequencing means 45 via a connection 61, and the second decoding means 60 can be controlled thereby via a connection 62. The outputs of the decoding means 59 and 60 are connected, via connections 63 and 64, to the sequencing means 45 so that the decoded data blocks SDB and QDB can be applied to the sequencing means 45 for the purpose of further processing.

To the output of the first decoding means 59 there are connected detection means 65 which can be controlled by the sequencing means 35 via a connection 66. The detection means 65 are arranged and constructed so as to detect the hash value HV which is contained in a selection data block SDB transmitted to the data carrier 2. The hash value HV detected by means of the detection means 65 can be output by the detection means 65, via a connection 67, to the sequencing means 45 in order to be processed in the sequencing means 45.

To the output of the second decoding means 60 there are connected test means 68 which can be controlled by the sequencing means 45 via a connection 69. The test means 68 are constructed in such a manner that they can test the validity of an acknowledge data block QDB transmitted by a station 1 and received by the data carrier 2. In the present case the test means 68 are constructed as comparison means. In case a received acknowledge data block QDB is recognized as a valid acknowledge data block QDB, the test means 68 generate an "acknowledge valid" signal QV which can be applied, via a connection 70, to the sequencing means 45 for further processing.

The circuit 42 of the data carrier 2 also includes encoding means 71, to the input of which there is connected the connection 48. The encoding means 71 can be controlled by the sequencing means 45 via a connection 72. The encoding means 71 are capable of encoding the identification data block IDB read from the memory section 46, as well as data blocks read from a further memory which is not shown. After completion of the encoding by means of the encoding means 71, the encoded data blocks can be applied to modulation means 73. In the modulation means 73 an auxiliary carrier signal is subjected in known manner to a modulation in conformity with the encoded data blocks, after which the modulated auxiliary carrier signal is applied, via the first terminal 43, to the receiver/transmitter means 40 so as to be inductively transmitted to a station 1.

The circuit 42 of the data carrier 2 also includes a so-called CRC8-stage 74 which can be controlled by the sequencing means 45 via a connection 75. The CRC8-stage 74 can receive, via the connection 50, the each time selected part PM1 or PM2 of the identification data block IDB which can be read, by means of the sequencing means 45, from the memory 46 in conformity with the hash value HV detected by the detection means 65 and supplied by the sequencing means 45. The part PM1 or PM2 each time applied to the CRC8 stage 74 is shifted through the CRC8 stage 74; during this operation an algorithm that can be realized by the CRC8 stage 74 is executed, after which a given value k1 or k2 is obtained at the output of the CRC8 stage 74, said values k1 and k2 being determined by the part PM1 or PM2, respectively, shifted through the CRC8 stage 74. The value k1 is used for generating the acknowledge data block QDB, as will be described in detail hereinafter. The value k2 is stored in a time slot register 76 which can be controlled by the sequencing means 45 via a connection 77.

The circuit 42 of the data carrier 2 also includes a time slot counter 78 which can be controlled by the sequencing means 45 via a connection 79. The time slot counter 78 constitutes time slot determination means. The time slot counter 78 is arranged to determine each time slot TS(1 . . . n . . . N) of possibly repeatedly successively running time slot sequences. Each of these time slot sequences consists of a given number N of successive time slots TS. The number N, that can be determined by means of the time slot counter 78, and the length of successive time slots TS of time slot sequences always correspond to the number and the length of the time slots TS of time slot sequences determined by the time slot counter 24 of a station 1. The time slot counter 78 can be supplied, via a further connection 80 which is branched off from the connection 54, with the clock signal CLK regenerated by means of the clock signal regenerating means 53. The time slot counter 78 determines each time slot TS of successively running time slot sequences on the basis of the regenerated clock signals CLK. The relevant content 1 . . . n . . . N of the time slot counter 78 can be applied from the output of the time slot counter 78, via a connection 81, to the sequencing means 45 so that the relevant contents are available for control purposes in the sequencing means 35.

The circuit 42 of the data carrier 2 also includes a comparator 82 which can be controlled by the sequencing means 45 via a connection 83. The comparator 82 can be supplied, via a connection 84, with the content k2 of the time slot register 76 as well as, via a connection 85 which is branched off from the connection 81, with the content 1 . . . n . . . N of the time slot counter 78. The comparator 82 provides comparison of the contents k2 and 1 . . . n . . . N received and outputs, in the case of corresponding received contents, a comparator signal COS to the sequencing means 45 via a connection 86. Communication between the carrier 2 and a station 1 can be enabled during a given time slot TS in dependence on the comparator signal COS, i.e. during the time slot TS(k2) fixed by the value k2.

The circuit 42 of the data carrier 2 also includes a generating stage 87 for generating an acknowledge data block QDB. The generating stage 87 can be controlled by the sequencing means 45 via a connection 88. The generating stage 87 can be supplied, via a connection 89, with control information in the form of the value k1 generated by the CRC8 stage 74. The generating stage 87 is constructed in such a manner that it is suitable to generate the acknowledge data block QDB having a bit configuration determined by the value k1 output as control information by the CRC8 stage. The acknowledge data block QDB generated by the generating stage 87 can be output via a connection 90 which is connected to the test means 68 which are constructed as comparison means. The test means 68, constructed in the form of comparison means, can thus be supplied with the acknowledge data block QDB generated by the generating stage 87 and with the acknowledge data block QDB transmitted by a station 1, received by the circuit 42 and decoded by means of the second decoding means 60. The test means 68 compare the two acknowledge data blocks QDB, the test means 68 output the "acknowledge valid" signal QV in the case of correspondence of the two acknowledge data blocks QDB, which signal QV can be applied to the sequencing means 45 via the connection 70.

The first decoding means 59 constitute first processing means which are arranged to process, i.e. to decode, a selection data block SDB which is transmitted by a station 1 in order to initiate a selection operation and is received via the terminal 43, said selection data block enabling the selection of the data carrier 2 from among a plurality of data carriers 2.

The encoding means 71 constitute second processing means which are arranged to process, after the processing, i.e. the encoding, of a received selection data block SDB by means of the first processing means, so the first encoding means 59, an identification data block IDB which is stored in the circuit 42 of the data carrier 2 and, after its processing by means of the second processing means, so the encoding means 77, can be applied, during a given time slot TS of a time slot sequence, to the receiver/transmitter means 40, via the terminal 33, for transmission to a station 1. The given time slot should be the $n^{th}$ time slot, where $1 \leq n \leq N$ and n=k2.

The second decoding means 60 constitute third processing means which are arranged to process, i.e. to decode, after correct reception in a station 1 of an identification data block IDB transmitted to this station 1 by the data carrier 2, an acknowledge data block QDB which is transmitted by this station 1 to the data carrier 2 and is received via the terminal 43, which acknowledge data block can set the circuit 42 of the data carrier 2 to a "selected" state.

The time slot register 76 in the data carrier 2 constitutes time slot fixation means which can fix, after the processing of the acknowledge data block QDB by the means of the third processing means, so the second decoding means 60, the each time $n^{th}$ time slot TS of successively generated time slot sequences for the circuit 42 of the data carrier 2, or the data carriers 2, where n=k2.

The comparator 82 and the sequencing means 45 constitute control means 91 whereby, after fixation of the circuit 42 of the data carrier 2 to the each time $n^{th}$ time slot TS, communication can be enabled between the data carrier 2 and a station 1 only during the each time $n^{th}$ time slot TS fixed for the circuit 42 of the data carrier 2, where n=k2.

The memory 46 and the CRC8 stage 74 and the generating stage 87 constitute generating means 92 for generating the acknowledge data block QDB associated with the data carrier 2 or the circuit 42.

The method for communication between the station 1 as shown in FIG. 1 and the data carrier 2 as shown in FIG. 2 will be described in detail hereinafter on the basis of a communication operation which is chosen by way of example.

Such a communication operation can be automatically started, for example by means of the sequencing means 3 of the station 1, at regularly successive time intervals. After the start of a communication operation, a selection data block SDB is generated by means of the first generating stage 6 of the station 1 in order to initiate a selection operation. Subsequently, the previously generated selection data block SDB is encoded by means of the encoding means 26; this means at the same time that the encoded selection data block SDB is amplitude modulated by means of the modulation means 27 and is subsequently transmitted, by means of the transmitter/receiver means 30, to all data carriers 2 present within the communication range of the station 1, so also to the data carrier 2 shown in FIG. 2.

Subsequently, the content of the time slot counter 24 of the station 1 is set to the value "1", the first time slot TS1 of a time slot sequence then running. The content "1" of the time slot counter 24 is applied to the second generating stage 18 via the connection 20.

After the transmission of the selection data block SDB, carried out by the station 1 at the beginning of the communication operation, the transmitted selection data block SDB is received by the receiver/transmitter means 40 of the data carrier 2, demodulated by means of the demodulation means 51 and decoded by means of the first decoding means 59. On the basis of the received, demodulated and decoded selection data block SDB, the detection means 65 detect the hash value HV, transmitted to the data carrier 2 by the station 1 within the selection data block SDB; this hash value is then applied to the sequencing means 45.

Subsequently, the sequencing means 45 generate the second bit address BA(HV)2 which is dependent on the hash value HV and is applied to the memory 46, thus fixing the part PM2 of the identification data block IDB stored in the memory 46. Subsequently, the value k2, for example being the value k2=1 in the present case, is determined by means of the CRC8 stage 74. Subsequently, the value k2=1 is stored in the time slot register 76 and hence the first time slot TS1 is fixed for the data carrier 2. The value k2 generated as the control information by the CRC8 stage 8, in this case being the value k2=1, is applied, via the connection 84, to the comparator 82 which in this case receives the value n=1 from the time slot counter 78 while the first time slot TS1 is running. The two values applied to the comparator 82 are thus equal, with the result that the comparator 82 applies the comparator signal COS to the sequencing means 45 via the connection 86. As a result, the sequencing means 45 control, via the connection 46, the memory 46 in such a manner that the memory 46 applies the identification data block IDB, being associated with the data carrier 2 and being characteristic of this data carrier 2, to the encoding means 71 via the connection 48. Subsequently, the identification data block IDB is encoded by means of the encoding means 71, after which it is modulated by means of the modulation means 73 and applied from the modulation means 73 to the transmitter/receiver means 40 in order to be transmitted to the station 1.

After application of the detected hash value HV to the sequencing means 45, subsequent to the generating of the second bit configuration BA(HV)2 by means of the sequencing means 45, in this case the first bit address BA(HV)1 which is dependent on the hash value HV is generated and applied to the memory 46, thus fixing the part PM1 of the identification data block IDB stored in the memory 46. Subsequently, the value k1 is determined as the control information by means of the CRC8 stage 74. Subsequently, the value k1 is applied to the generating stage 87, with the result that the generating stage 87 generates the acknowledge data block QDB whose bit configuration is determined by the part PM1 of the identification data block IDB. The acknowledge data block QDB generated by means of the generating stage 87 is applied to the test means 68 via the connection 90.

After the transmission of the selection data block SDB it may occur that during the first time slot TS1 either no data carrier 2 or just one data carrier 2 or also more than one data carrier 2 receives the selection data block SDB and responds to the received selection data block SDB while transmitting its associated identification data block IDB, each of which has a given bit configuration, to the station 1 in response to the selection data block SDB transmitted by the station 1.

An identification data block IDB transmitted by a data carrier 2 is received by the station 1, that is to say by means of the transmitter/receiver means 30. Subsequently, each identification data block IDB received is demodulated by means of the demodulation means 33 and each identification data block IDB received is decoded by means of the decoding means 34. Subsequently, the collision detection means 37 detect whether a collision has taken place between at least two identification data blocks IDB or whether no identification data block IDB has even been received and decoded. When this is the case, the collision detection means 37 apply collision information CI to the sequencing means 3, with the result that no identification data block IDB is applied to the memory 11 via the connection 12; therefore, subsequently no acknowledge data block QDB will be generated by means of the generating means 10.

However, if the collision detection means 37 detect that only one identification data block IDB has been received and decoded by means of the decoding means 34, the decoded identification data block IDB is applied, via the connection 36, to the sequencing means 3 which ensure that subsequently the identification data block DB received in the first time slot TS1 is applied to the memory 11 via the connection 12. Subsequently, using the hash value HV which is contained in the sequencing means 3 and has already been transmitted to the data carrier 2 by way of the selection data block SDB, and also using the bit address BA(HV)1, corresponding to the hash value HV, the part PM1 of the identification data block IDB is selected so as to be applied to the CRC8 stage 15. Subsequently, the selected part PM1 of the identification data block IDB is applied from the memory 11, via the connection 14, to the CRC8 stage 15, so that subsequently at the output 17 of the CRC8 stage there is obtained the value k1 which is derived in dependence on the part PM1 and serves as control information which is applied to the second generating stage 18 in order to generate the acknowledge data block QDB. Subsequently, using the second generating stage 18, an acknowledge data block QDB, having a bit configuration determined by the value k1 and being associated with the data carrier 2 having transmitted its identification data block to the station 1 during the first time slot TS1, is generated in response to the received identification data block IDB. The bit configuration of this acknowledge data block QDB is formed while utilizing only the part PM1 of the identification data block IDB, associated with the relevant data carrier 2, which was stored in the memory 11.

Subsequently, the generated acknowledge data block QDB is applied to the encoding means 26 via the connection 23. The encoding means 26 provide encoding of the acknowledge data block QDB, after which the decoded acknowledge data block QDB is modulated by means of the modulation means 27; the encoded and modulated acknowledge data block QDB is then transmitted, by means of the transmitter/receiver means 30, to the data carrier 2 with which the generated acknowledge data block QDB is associated.

Subsequently, the transmitted acknowledge data block QDB is also received by the data carrier 2 with which the acknowledge data block QDB transmitted by the station 1 is associated. The reception of the acknowledge data block QDB associated with the data carrier 2 of FIG. 2 takes place by means of the receiver/transmitter means 40 which apply the received acknowledge data block QDB to the demodulation means 51. The demodulation means 51 apply the demodulated acknowledge data block QDB to the second decoding means 60 which provide encoding and the decoded acknowledge data block QDB is subsequently applied to the test means 68.

When the acknowledge data block QDB transmitted to the data carrier 2 by the station 1 is applied to the test means 68, the test means 68, being constructed as comparison means, compare the acknowledge data block QDB transmitted to the data carrier 2 by the station 1 with the acknowledge data block QDB generated by the generating stage 87. If no disturbing effects have been exerted on the acknowledge data block QDB transmitted by the station 1 to the data carrier 2, the two acknowledge data blocks QDB applied to the test means 68 will be identical; the test means 68 then output the "acknowledge valid" signal QV to the sequencing means 45. This "acknowledge valid" signal, can set the data carrier 2 to a "selected" state.

After the transmission of the selection data block SDB, it may occur that two data carriers 2 receive the transmitted selection data block SDB in the first time slot TS1, each data carrier containing a respective identification data block IDB1 and IDB2, of which both parts PM2, however, correspond; consequently, the value k2=1 is determined for both data carriers 2 and hence both data carriers 2 transmit their identification block IDB1, IDB2 in the first time slot TS1. In that case it may occur that a first one of these two data carriers 2 is situated near enough to the station 1, but the second one of these data carriers is situated too far from the station 1, so that the station 1 receives only the identification data block IDB1 from the first data carrier 2. Using the identification data block IDB1 received from the first data carrier 2, the control information corresponding to the part PM1 of this identification data block IDB1, i.e. the value k1, is determined and an acknowledge data block QDB1 is generated whose bit configuration is determined by this value k1, so by the part PM1. This acknowledge data block QDB1, whose bit configuration is determined by the value k1, is transmitted by the station 1 to the first data carrier 2 as well as to the second data carrier 2. In these two data carriers a respective acknowledge data block QDB1 and QDB2 is also generated, their bit configurations being dependent on the part PM1 of their identification data blocks IDB1 and IDB2, respectively. Even though the part PM2 of the identification data blocks IDB1 and IDB2, respectively, which is decisive as regards the fixation of the first time slot TS1 is the same for both data carriers 2, it has to be assumed with the greatest likelihood that, despite the correspondence of the parts PM2, the parts PM1 of the identification data blocks IDB1 and IDB2 of the two data carriers 2 are different, so that it must be assumed that the acknowledge data block QDB1 is generated only in the first data carrier 2 and that a different acknowledge data block QDB2 is generated in the second data carrier 2, so that the acknowledge data block QDB1 transmitted by the station 1 is valid only for the first data carrier 2 which is situated near enough to the station 1, and hence only the data carrier 2 situated near enough to the station 1 is acknowledged, i.e. set to its "selected" state, whereas the second data carrier 2 which is situated further from the station 1 is not acknowledged. Undue acknowledgement of a data carrier 2 which is situated too far from a station 1 is thus definitely precluded. Thus, despite the use of acknowledge data blocks QDB having a short data block length of only, for example 8 bits, correct and error-free acknowledgement of only a single data carrier 2 is always ensured, even if a data carrier 2 which is not recognized by the station 1 is situated within the communication range of the station 1; because of its comparatively large distance from the station 1, such a non-recognized data carrier 2 can receive data blocks from the station 1 but cannot transmit data blocks to the station 1.

The operation described above for the first time slot TS1 is carried out for all further time slots TS2, TS3 to TSN, after which a communication operation for the selection and acknowledgement of data carriers 2 is terminated.

It is to be noted that, after such a communication operation for the selection and acknowledgement of data carriers 2 which are then in their "selected" state, further communication operations may be executed, for example a read operation for reading data, stored in data carriers 2, from the selected data carriers 2 during the read operation so as to transmit this data to the station 1, or a write operation during which data contained in the station 1 is transmitted to the selected data carriers 2 and written into memories of these data carriers 2.

As will be apparent from the foregoing description, in the station 1 shown in FIG. 1 and in the data carrier 2 shown in FIG. 2 it is simply achieved, using only simple means, that for the acknowledgement of the selection of a data carrier 2 an acknowledge data block QDB which is associated exclusively with the relevant data carrier 2 is transmitted to this data carrier 2 by the station 1, and that this is advantageously achieved by means of an acknowledge data block QDB having only a short data block length, because the acknowledge data block QDB is formed while utilizing only a part PM1 of the identification data block IDB associated with the relevant data carrier 2. The advantages of such an acknowledge data block QDB of only short data block length reside mainly in an as short as possible transmission time as required for the transmission from a station 1 to a data carrier 2, and in the fact that as few modulation steps as possible suffice for the transmission of such an acknowledge data block QDB from a station 1 to a data carrier 2, this is very advantageous with a view to achieving as low as possible levels of the side bands of the carrier signal CS used for the transmission.

What is claimed is:

1. A method for communication between a write/read station (1) of a transponder system and at least one transponder (2) of the transponder system, in which a selection block (SDB) is transmitted by the write/read station (1) to at least one transponder (2), in which the transmitted selection data block (SDB) is received by at least one transponder (2), in which, after reception of the transmitted selection data block (SDB), at least one transponder (2) transmits an identification data block (IDB), which is associated with this transponder and has a given bit configuration, to the write/read station (1) in response to the transmitted selection data block (SDB), in which the transmitted identification data block (IDB) is received by the write/read station (1), in which, after reception in the write/read station (1) of the identification data block (IDB) associated with the transponder (2), an acknowledge data block (QDB), which is associated with this transponder (2) and has a given bit configuration, is generated in response to the received identification data block (IDB), in which the generated acknowledge data block (QDB) is transmitted by the write/read station (1) to the transponder (2) with which the generated acknowledge data block (QDB) is associated, and in which the transmitted acknowledge data block (QDB) is received by the transponder (2) with which the acknowledge data block (QDB) is associated, the acknowledge data block (QDB) associated with a transponder (2) being related to the identification data block (IDB) associated with this transponder (2), characterized in that in the write/read station (1) an acknowledge data block (QDB) is generated for each transponder (2) wherefrom an identification data block (IDB) has been received, the bit configuration of said acknowledge data block being formed while using only a part (PM1) of the identification data block (IDB) associated with the relevant transponder (2).

2. A method as claimed in claim 1, characterized in that the bit configuration of the acknowledge data block (QDB) each time generated in the write/read station (1) is calculated while using a hash value (HV) contained in the write/read station (1).

3. A method as claimed in claim 1, characterized in that like in the write/read station (1), the acknowledge data block (QDB) associated with a transponder (2) is also generated with a given bit configuration in this transponder (2), that the acknowledge data block (QDB) generated in this transponder (2) and the acknowledge data block (QDP) generated in the write/read station (1) and transmitted to this transponder (1) are compared, and that at least control information (QV) representing the comparison result is generated.

4. A method as claimed in claim 3, characterized in that the bit configuration of the acknowledge data block (QDB) generated in a transponder (2) is calculated while using a hash value (HV) contained in the transponder (2).

5. A write/read station (1) for a transponder system which is arranged to communicate with at least one transponder (2) of the transponder system and includes a generating station (6) for generating a selection data block (SDB), transmitter means (30) for transmitting the generated selection data block (SDB) to at least one transponder (2), receiver means (30) for receiving an identification data block (IDB) which is transmitted to the write/read station (1) by the transponder (2), in response to the selection data block (SDB) transmitted to this transponder (2), and is associated with this transponder (2), processing means (33, 34, 3) for processing a received identification data block (IDB) generating means (10) for generating an acknowledge data block (QDB) which is associated with a transponder (2) and has a given bit configuration, and transmitter means (30) For transmitting a generated acknowledge data block (QDB) to the transponder (2) with which the generated acknowledge data block (QDB) is associated, the acknowledge data block (QDB) associated with a transponder (2) being related to the identification data block (IDB) associated with this transponder (2), characterized in that the generating means (10) are arranged to generate a respective acknowledged data block (QDB) for a transponder (2), the bit configuration of said acknowledge data block being formable while using only a pan (PM1) of the identification data block (IDB) associated with the relevant transponder (2).

6. A write/read station (1) as claimed in claim 5, characterized in that the generating means (10) include a memory (11) for storing a received identification data block (IDB), a part (PM1) of the stored identification data block (IDB) being readable from said memory (11) in dependence on a hash value (HV) contained in the write/read station (1), that the generating means (10) include a CRC8 station (15) which is supplied with the read part (PM1) of the stored identification data block (IDB) and outputs control information (k1) corresponding to the read part (PM1) of the stored identification block (IDB), and that the generating means (10) include a generating stage (18) for generating an acknowledge data block (QDB) having a bit configuration which is determined by the control information (k1) output by the CRC8 stage (15).

7. A transponder (2) for a transponder system, which transponder is arranged to communicate with at least one write/read station (1) and includes receiver means (40) for receiving a selection data block (SDB) transmitted by a write/read station (1), processing means (51, 59) for processing a received selection data block (SDB), transmitter means (40) for transmitting an identification block, associated with the transponder (2), to a write/read station (1) in response to the selection data block (SDB) transmitted to the transponder (2) by the write/read station (1), receiver means (40) for receiving an acknowledge data block (QDB), which is transmitted to the transponder (2) by the write/read station (1) in response to the identification data block (IDB) applied to the write/read station (1) by the transponder (2), is associated with the transponder (2), and has a give bit configuration, and processing means (51, 60) for processing the received acknowledge data block (QDB), characterized in that the transponder (2) includes generating means (92) for generating the acknowledge data block (QDB) associated with the transponder (2), and that the transponder (2) includes comparison means (68) which is supplied with the acknowledge data block (QDB) generated by the generating means (92) and with the acknowledge data block (QDB) transmitted by a write/read station (1) and received by the transponder (2), and outputs at least control information (QV) representing the comparison result.

8. A transponder (2) as claimed in claim 7, characterized in that the generating means (92) include a memory (46) for storing an identification data block (IDB), a part (PM1) of the stored identification data block (IDB) being readable from said memory (46) in dependence on a hash value (HV) contained in the transponder (2), that the generating means (92) include a CRC8 stage (74) which is supplied with the read part (PM1) of the stored identification data block (IDB) and outputs control information (k1) corresponding to the read part (PM1) of the stored identification data block (IDB), and that the generating means (92) include a generating station (87) for generating an acknowledge data block (QDB) having a bit configuration which is determined by the control information (k1) output by the CRC8 stage (74).

9. An integrated circuit (42) for a transponder (2) which is arranged to communicate with at least one write/read station (1), which integrated circuit includes receiving connection means (43) for receiving a selection data block (SDB) transmitted by a write/read station (1), processing means (51, 59) for processing a received selection data block (SDB), output connection means (43) for outputting an identification data block (IDB), associated with the circuit (42), to a write/read station (1) in response to the selection data block (SDB) transmitted to the circuit (42) by the write/read station (1), receiver means (40) for receiving an acknowledge data block (QDB), which is transmitted to the circuit (42) by the wire/read station (1), is associated with the circuit (42) and has a give bit configuration, and processing means (51, 60) for processing the received acknowledge data block (QDB) characterized in that the circuit (42) includes generating means (92) for generating the acknowledge data block (QDB) associated with the circuit (42), and that the circuit (42) includes comparison means (68) which is supplied with the acknowledge data block (QDB) generated by the generating means (92) and with the acknowledge data block (QDB) transmitted by the write/read station (1) and received by the circuit (42), and outputs at least control information (QV) representing the comparison result.

10. An integrated circuit (42) as claimed in claim 8, characterized in that the generating means (92) include a memory (46) for storing an identification data block (IDB), a part (PM1) of the stored identification data block (IDB) being readable from said memory (46) in dependence on a hash value (HV) contained in the circuit (42), that the generating means (92) includes a CRC8 stage (74) which can be supplied with the read part (PM1) of the stored identification data block (IDB) and can output control information (k1) corresponding to the read part (PM1) of the stored identification data block (IDB), and that the generating means (92) include a generating stage (87) for generating an acknowledge data block (QDB) having a bit configuration which is determined by the control information (k1) output by the CRC8 stage (74).

* * * * *